Jan. 16, 1968    D. A. MURRAY ET AL    3,363,707
BALE WEIGHT INDICATOR
Filed Oct. 31, 1966
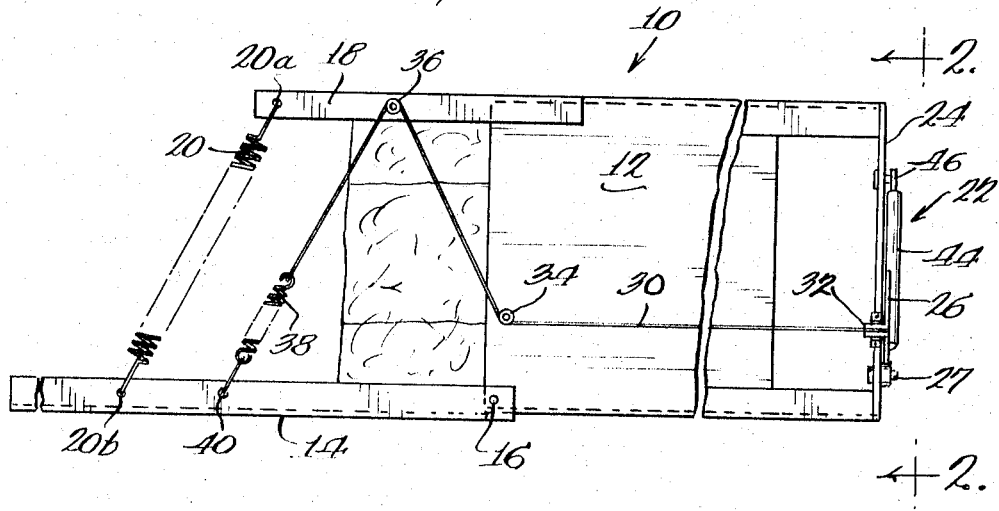
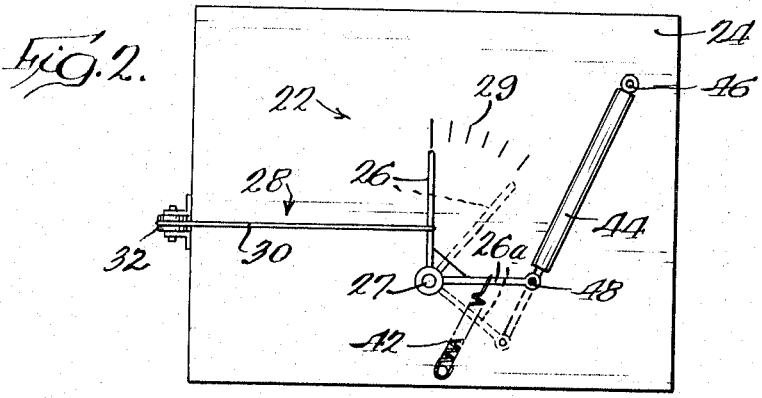
Inventors:
Donald A. Murray
William C. Sexton
By Robert B. Gin
Atty United States Patent Office 3,363,707
Patented Jan. 16, 1968

3,363,707
BALE WEIGHT INDICATOR
Donald A. Murray, Hinsdale, Ill., and William C. Sexton, Stockton, Calif., assignors to International Harvester Company, Chicago, Ill., a corporation of Delaware
Filed Oct. 31, 1966, Ser. No. 590,661
4 Claims. (Cl. 177—136)

ABSTRACT OF THE DISCLOSURE

Bale weight indicating means for a hay baler in which dampening means is connected with the weight indicator remote from and independent of the bale exit platform. The dampening means dampens movement of the indicator from the indicated position to provide sufficient observation time for the operator.

---

This invention relates to hay baling devices and more particularly to a weight indicator means for individual bales of hay which are discharged from the rear end thereof.

Typically, in hay baler construction, the bales of hay are formed in a bale chamber and are moved outwardly to the rear of the chamber to a platform which is pivoted thereto. It has been common to connect mechanical linkage from a scale to the platform so that the weight of the bale may be read at a point remote from the platform. As the bale reaches the balance point over the rear edge of the platform, the bale weight reading is obtained, after which the bale tips off the platform and the platform returns to a generally horizontal position.

However, the action of the bale tipping the platform is extremely rapid, making it difficult to observe the rather instantaneous scale reading obtained therefrom. As a result, it has also been common to place some sort of a dampening means in the area of the platform to dampen the action of the platform in an effort to reduce the rapidity of movement of the scale pointer element. However, it has been found that the interposition of a dampening element between the pivoted platform and the rear of the bale chamber interferes with the normal progression of hay bales outwardly from the chamber. In particular, frequently the platform fails to return to a horizontal position soon enough to receive the next bale which is progressing outwardly from the chamber. This presents problems both in the disposal of the bales as well as in obtaining a sufficiently accurate reading of the weight of the bales.

It is therefore a primary object of this invention to provide an improvement in the indicator mechanism associated with the exit platform of a hay baler.

Another object of this invention is to provide an improved indicator assembly for indicating the weight of bales which are discharged from the rear of a hay baler which permits the pivoted bale exit platform to pivot freely responsive to the weight of bales fed thereon and to freely return to a position for receiving the next bale fed progressively outwardly from the baling chamber.

Other objects, features and advantages of the present invention will be apparent from the following description of the preferred embodiments illustrated in the accompanying drawings, in which:

FIGURE 1 is a generally diagrammatic broken view of a hay baler showing a bale of hay progressing outwardly from a baling chamber into position on a pivoted exit platform and further showing the linkage for the bale weight indicator extending from the platform to a forward portion on the hay baler; and FIGURE 2 is a view taken generally along the lines 2—2 of FIGURE 1 which is a substantially end elevational view of a forward portion of the hay baler on which the weight indicator scale is located.

As shown in FIGURE 1, a hay baler, generally indicated 10, includes a bale chamber 12 wherein the hay is compacted together and bound into a bale, and a bale chamber extension or exit platform 14 which is pivoted to the chamber 12 by means of a pivot pin 16 or the like. A support arm 18 extends outwardly from the top of the bale chamber 12 and one end 20a of a support spring 20 is secured to the arm 18 and the other end 20b of the spring 20 is secured to platform 14 to normally hold the platform in a generally horizontal attitude.

A bale weight scale 22 is provided on the baler preferably near the intended location of a prime mover, such as on the front wall 24. Generally the scale includes a movable element or pointer 26 having a leg 26a pivoted at 27 to the front wall 24 and affixed to linkage means 28, to be described later, so as to be responsive to movement of platform 14. Further included in scale means 22 are a plurality of fixed indicia 29 on the front wall 24 which represent various weight values.

Linkage means 28 includes a suitable link member, such as cable 30, which extends rearwardly toward the platform 14. To change the plane of direction of the cable 30, suitable sheave or eye means 32, 34 and 36 may be provided at spaced points along the baler. The rear portion of the cable 30 is wound about sheave 36 to extend downwardly for securement with a cushion spring 38 which, in turn, is affixed to platform 14 at 40. Thus as platform 14 is moved downwardly, cable 30 will be pulled accordingly and will, in turn, cause the pointer 26 to be moved from an at rest position, as shown in dotted outline in FIGURE 2, to a weight indicating position, as shown in full outline in FIGURE 2.

A return spring 42 is affixed to the leg 26a of pointer 26 to urge the pointer to a return position of zero reading as the platform returns to a generally horizontal attitude responsive to the urging of spring 20 after a bale of hay has been deposited. Means are provided, associated with the indicator mechanism remote from the platform 14, for dampening the action of the linkage 28 and thereby attenuate the rapidity of movement of element 26 responsive to movement of platform 14 to permit a reading of weight values to be easily obtained. In the preferred embodiment, this means takes the form of a shock absorber 44 which is pivoted at one end 46 to the hay baler forward wall 24 and at the other end 48 to leg 26a of the pointer element 26. As the element 26 is pulled from a zero position to a weight indicating position and then back to the zero position, the retarding influence of the shock absorber will dampen this movement permitting reading by casual observance of an operator to determine the approximate weight of a bale deposited from the platform.

Positioning the dampening means remote from the platform 14 permits the platform 14 to act freely responsive to the weight of bales which are fed thereon and the return action of the spring 20 and therefore return to the position shown in FIGURE 1 in time to receive the next bale fed thereon. In addition, the cost of the overall weight indicating assembly is reduced in that a smaller, and therefore less expensive, shock absorbing or snubbing device 44 may be utilized than would be required for use in dampening the movement of platform 14.

The foregoing detailed description has been given for clearness of understanding only, and no unnecessary limitations should be understood therefrom, as some modifications may be obvious to those skilled in the art.

We claim:
1. In a hay baler having a baling chamber and an exit platform pivoted to the rear of the chamber for receiving bales from the chamber and depositing bales onto the baler supporting surface, bale weight indicating means comprising linkage means connected to the platform for movement therewith responsive to the action of the bales being received and dumped therefrom and scale means on the baler spaced from said platform, said scale means including a movable element connected to the linkage means for movement therewith to and from an indicated position responsive to bale weight, and a stationary element, one of said elements being graduated in units of weight so that the relative movement of the two elements produces a measurement of weight responsive to hay bales being deposited from the platform, and dampening means connected to the bale weight indicating means independent of the platform at a point on the baler remote from the platform to dampen movement of the movable element from said indicated position so that the rapid action of the bale weight indicating means responsive to bale discharge and dumping will be sufficiently attenuated to permit a reading of the bale weight by casual observance while permitting free pivotal movement of the platform.

2. The hay baler of claim 1 wherein the dampening means is connected to the movable element of the scale means.

3. The hay baler of claim 2 wherein the movable element of the scale means is a pointer.

4. The hay baler of claim 3 wherein the pointer is pivoted to a wall of the baler and includes a leg member to which the dampening means is secured; and wherein a return spring is connected to the leg to return the pointer to a zero position after deposit of a bale from the platform.

References Cited
UNITED STATES PATENTS

| | | | |
|---|---|---|---|
| 2,796,825 | 6/1957 | Kriegbaum et al. | 100—43 |
| 2,948,213 | 8/1960 | Jay et al. | 100—99 |
| 3,126,069 | 3/1964 | Shepley | 177—136 |

RICHARD B. WILKINSON, *Primary Examiner.*

GEORGE MILLER, *Assistant Examiner.*